Patented July 15, 1947

2,424,182

UNITED STATES PATENT OFFICE 2,424,182

SYNTHETIC RUBBERLIKE BUTADIENE-ACRYLONITRILE - ALIPHATIC VINYL-ETHINYL CARBINOL MATERIAL

Charles J. Mighton, Wilmington, Del., assignor to E. I. du Pont de Nemours & Company, Wilmington, Del., a corporation of Delaware No Drawing. Application February 12, 1944, Serial No. 522,084

4 Claims. (Cl. 260—84.5)

This invention relates to synthetic rubber-like materials, and more particularly to the preparation of new, synthetic rubber-like material produced by the copolymerization of butadiene-1,3, acrylonitrile and alkenylethinyl carbinol.

While it is known that the polymerization of butadiene with other polymerizable materials yields, in some cases, oil-resistant rubbers and in others highly freeze-resistant rubbers, the combination in one product of good rubber-like properties together with both high oil-resistance and high freeze-resistance has not heretofore been attained, to my knowledge. Many attempts to produce a butadiene synthetic rubber possessing the latter characteristic have yielded products with such poor processing properties that they could not be utilized commercially.

It is therefore an object of this invention to prepare a highly oil- and freeze-resistant artificial rubber having improved processing characteristics. A further object of the invention is to prepare a butadiene synthetic rubber that is readily processable, which exhibits high oil- and freeze-resistance, and which has improved resilience.

I have found that the objects of this invention can be accomplished by copolymerizing a mixture comprising 70% to 80% of butadiene, 10% to 25% of acrylonitrile, and 5% to 10% of a vinylethinyl carbinol.

As a preferred method for effecting this invention, the monomer mixture containing 70% to 80% of butadiene, 10% to 25% of acrylonitrile, and 5% to 10% of the vinylethinyl carbinol is dispersed in an aqueous emulsion containing a polymerization catalyst, preferably of the peroxide or persulfate type, and polymerized at a temperature which is preferably in the range 20° C. to 40° C. The resulting latex is stabilized with an antioxidant such as phenyl-alpha-naphthylamine and coagulated by the addition of an appropriate material determined by the type of emulsifying agent originally employed. The coagulum is washed free of emulsifying agents and residual salts and dried. The product may then be compounded, molded, and vulcanized following standard procedures developed for rubber and butadiene-type synthetic elastomers in general. The butadiene and acrylonitrile used are standard commercial products. The vinylethinyl carbinols may be prepared by the reaction of sodium monovinylacetylide with aliphatic ketones or aldehydes as described in U. S. Patent 1,963,934 or by the reaction of monovinylacetylenes with aliphatic ketones in the presence of potassium hydroxide as described by Nazarov in Bulletin of Academy of Science, USSR, 1938, pages 683-94; C. A. 33 5682.

The following examples are given to illustrate the invention. Unless otherwise specified, the parts used are by weight.

EXAMPLE 1

A mixture of 70 parts of butadiene, 25 parts of acrylonitrile and 5 parts of dimethyl(vinylethinyl)carbinol, prepared by reaction of acetone with monovinylacetylene in the presence of potassium hydroxide, is emulsified in 157 parts of an aqueous solution containing 4 parts of oleic acid with sufficient sodium hydroxide to neutralize the oleic acid and leave 0.5 part in excess, together with 1 part of the condensation product of sodium naphthalenesulfonate and formaldehyde, 0.5 part of potassium persulfate, and 0.5 part of potassium ferrocyanide. To the emulsified monomer is added 1 part of octyl mercaptan and the mixture is then heated for 16 hours at 30° C. with agitation in a glass-lined reaction vessel. The resulting latex is removed and treated with 2% of a mixture of phenyl-alpha-naphthylamine and diphenylamine (55:45) dispersed in water, after which the latex is acidified with acetic acid and coagulated by means of saturated sodium chloride solution. The coagulum is then washed for 10 minutes under warm water on a corrugated rubber mill to remove residual salts, and finally dried by milling on a smooth mill at elevated temperatures. The resulting product, which is considerably more plastic and easier to mill than a 70:30 butadiene/acrylonitrile interpolymer prepared in the same manner, is compounded according to the following recipe:

| | |
|---|---|
| Elastomer | 100 |
| Channel black | 50 |
| Stearic acid | 2 |
| Zinc oxide | 5 |
| Sulfur | 2 |
| 2-mercaptothiazoline | 1.25 |

The compounded stock, vulcanized in a mold for 30 minutes at 141° C., yields a product having a tensile strength of 3410 lbs./sq. in. at 350% elongation, Shore type A hardness of 71 and Schopper rebound of 37%, with excellent oil resistance as indicated by only 26% volume increase after 2 days' immersion in kerosene at 100° C., and good freeze resistance as indicated by a $T_{50}$ value of $-23°$ C. (The $T_{50}$ test is carried out as follows: A vulcanizate of uniform cross-section is stretched 170% or more and cooled slowly to $-70°$ C. in this stretched condition. The tension on the sample is then released, the temperature is raised slowly, and the sample is allowed to contract freely. The temperature at which the sample shows 50% of the total retraction possible is recorded as the $T_{50}$ value.)

The excellence of the oil resistance as indicated by only 26% volume increase in kerosene may be more easily understood by comparison with that of other elastomers. Thus, a 70:30 butadiene/styrene copolymer swells about 200%, and natural rubber actually disintegrates after swelling 300%-400% in the same test. Although the volume increase exhibited by the three component butadiene/acrylonitrile/dimethyl(vinylethinyl) carbinol copolymer containing 70% of butadiene is approximately the same as that of a 70:30 butadiene/acrylonitrile polymer of the type known as Perbunan, the latter is inferior with respect to milling characteristics and its vulcanizates show less freeze resistance, as indicated by a $T_{50}$ value of $-17°$ C. Furthermore, the two component butadiene/acrylonitrile products are less resilient, showing a Schopper rebound of 32% as compared with 37% for the dimethyl(vinylethinyl) carbinol modification.

EXAMPLE 2

A mixture of 75 parts of butadiene, 18 parts of acrylonitrile, and 7 parts of dimethyl(vinylethinyl) carbinol is emulsified in 158 parts of an aqueous solution containing 4 parts of the sodium salt of oleic acid, 2 parts of the sodium salt of rosin, 0.5 part sodium hydroxide, 1 part of a formaldehyde/sodium naphthalenesulfonate condensation product, 1 part of potassium persulfate, and 0.15 part of potassium ferricyanide. Two parts of lauryl mercaptan is added and the emulsion is then heated for 24 hours at 30° C. in an enamel-lined autoclave provided with a stirrer for agitation. The resulting latex is stabilized with 2% of a 55:45 mixture of phenyl-alpha-naphthylamine and diphenylamine dispersed in water, acidified with acetic acid, and coagulated by means of brine. An 85% yield of a soft, plastic polymer is obtained. This product, after being washed and dried, has good mill behavior, being much superior to a 75:25 butadiene/acrylonitrile copolymer in this respect. It may be compounded as described in Example 1 and cured to a rubbery vulcanizate having the following properties: tensile strength=4100 lbs./sq. in. at 450% elongation; Schopper rebound=40%; volume increase after 48 hours' immersion in kerosene at 100° C.=50%; freeze resistance as measured by $T_{50}=-30°$ C. Although the kerosene resistance of this product is inferior to that of the copolymer described in Example 1, it will be noted that there is a substantial improvement in freeze resistance and in rebound.

For purposes of comparison, the properties of typical vulcanizates of butadiene/acrylonitrile/dimethyl(vinylethinyl) carbinol (BD/AN/DMVEC) compositions included within the scope of this invention are listed in Table I. The vulcanizates are compounded and cured as described above.

Table I

| No. | BD/AN/DMVEC Ratio | Tensile Strength | Elongation | Schopper Rebound | $T_{50}$ | Volume Increase in Kerosene at 100° C. |
|---|---|---|---|---|---|---|
| | | P. s. i. | Per Cent | Per Cent | ° C. | Per Cent |
| 1 | 70:25:5 (Ex. 1) | 3,410 | 350 | 37 | −23 | 26.3 |
| 2 | 70:20:10 | 4,690 | 560 | 40 | −23 | 30.9 |
| 3 | 75:18:7 (Ex. 2) | 4,100 | 450 | 40 | −30 | 50.9 |
| 4 | 80:15:5 | 3,530 | 430 | 42 | −33 | 68.2 |
| 5 | 80:10:10 | 3,130 | 370 | 40 | −34 | 93.0 |

Whereas, copolymers obtained from initial 80:20 butadiene/acrylonitrile monomer mixtures are extremely tough and difficult to mill, those resulting from mixtures in which a portion of the acrylonitrile is replaced by dimethyl(vinylethinyl) carbinol (as Nos. 4 and 5 in Table I) are comparatively easy to process.

EXAMPLE 3

A mixture of 70 parts of butadiene, 25 parts of acrylonitrile, and 5 parts of ethylmethyl(vinylethinyl) carbinol is emulsified in 158 parts of the same aqueous medium as described in Example 2. After the addition of 2 parts of lauryl mercaptan, the emulsion is heated at 40° C. for 18 hours in a sealed glass tube which is rotated end-over-end for agitation. The latex is stabilized as in Example 2, acidified with acetic acid, and coagulated with brine. The resulting plastic mass, after being washed and dried, consists of 98 parts of good milling, rubber-like material. This product may be compounded by the recipe given in Example 1 or by the following:

| | |
|---|---|
| Elastomer | 100 |
| Channel black | 50 |
| Stearic acid | 2 |
| Sulfur | 2 |
| Zinc oxide | 5 |
| Mercaptobenzothiazole | 1 |

The compounded stock is cured in a mold for 20 minutes at 141° C. to yield a vulcanizate having a tensile strength of 3460 lbs./sq. in. at 410% elongation, rebound of 37%, $T_{50}$ value of $-25°$ C. and a kerosene absorption of 26%.

Following the procedure described above, an 89% yield of good milling rubber is obtained from an 80:15:5 mixture of butadiene/acrylonitrile/diisopropyl(vinylethinyl) carbinol. When compounded and cured, this product yields a rubbery vulcanizate having a tensile strength of 3460 lbs./sq. in. at 410% elongation, a rebound of 45%, a $T_{50}$ value of $-31°$ C., and kerosene absorption of 66.6%. A synthetic rubber obtained in 100% product yield from an 80:10:10 butadiene/acrylonitrile/1-(vinylethinyl) cyclohexanol mixture also exhibits good processing characteristics and gives strong resilient vulcanizates. In general, it is found that vinylethinyl carbinols prepared from vinylacetylenes and cyclohexanone result in copolymers which show greater swelling in oils than those obtained with dimethyl(vinylethinyl) carbinol.

It is to be understood that the examples are illustrative only, and that other ratios of monomers within the limits of 70%-80% of butadiene, 10%-25% of the acrylonitrile, and 5%-10% of the vinylethinyl carbinol may be used. If less than 70% of butadiene is used, the resulting products show somewhat poorer freeze resistance, and if more than 80% of butadiene is used the products are not sufficiently oil resistant for many applications. Similarly, for most purposes, 5% of the vinylethinyl carbinol is sufficient to produce the desired improvement in processing characteristics when the polymers contain butadiene and acrylonitrile in the above specified proportions. However, not more than 10% of the carbinol is desirable if the best balance between oil resistance, freeze resistance, and processing characteristics is to be obtained. The proper monomer ratio will depend obviously on the particular application intended for the resulting rubber.

In place of acrylonitrile, alpha alkyl substituted acrylonitriles, such as methacrylonitrile, may be employed in combination with butadiene and a vinylethinyl carbinol. However, the substituted acrylonitriles result in rubbers of somewhat less oil resistance, and for this reason, as well as its greater availability, acrylonitrile is preferred.

The alkenylethinyl carbinol may be prepared in many different ways, as indicated hereinbefore. Any aliphatic vinylethinyl carbinol may be employed, but those having two alkyl substituents on the carbinol carbon atom, such as dimethyl-, ethylmethyl-, diethyl-, or dipropyl-(vinylethinyl) carbinol, are preferred since they appear to have the greatest softening effect. Likewise, vinylethinyl carbinol itself, or methyl-, ethyl-, propyl-, or butyl(vinylethinyl) carbinols, prepared from monovinylacetylene and the corresponding aldehydes, and the isopropenylethinyl carbinol, may be employed. Polymerizable carbinols, prepared by the reaction of aliphatic aldehydes or ketones with substituted monovinylacetylenes such as 2-methylbutene-1-yne-3, are also operable.

The monomer mixture may be polymerized in any convenient manner, but generally best results are obtained by using the emulsion polymerization technique. Although an alkaline sodium oleate or sodium oleate-rosinate system as described in the examples is generally preferred, it is quite possible to use other emulsifying agents in either alkaline or acid media. Thus, alkali salts of naphthenic acids or long chain aliphatic sulfonic acids, and alkyl-naphthalene sulfonic acids are satisfactory. Betaines such as C-cetyl or N-hydroxypropyl-C-cetyl-betaine and quaternary ammonium salts having long carbon chains such as cetyl trimethyl ammonium bromide may be used. As polymerization catalyst, potassium persulfate is preferred, although other materials such as hydrogen peroxide, benzoyl peroxide, or sodium perborate may be used, if desired. Catalyst activators such as potassium ferricyanide, used in conjunction with persulfates or peroxides, are especially beneficial by way of accelerating polymerizations. Softeners or polymerization modifiers other than octyl or lauryl mercaptans such as carbon tetrachloride, or diisopropyl xanthogen disulfide, may be employed, if desired. It is possible to carry out these polymerizations under many diverse conditions and in the presence of many different ingredients commonly used for modification of the emulsion or of the rate of polymerization.

The polymerization temperature may be varied within the limits of 5° C. to 80° C., temperatures of 20°–40° C. being preferred. The time required to obtain high yields of the polymerizate will vary, of course, with the temperature, the catalyst, and the emulsion system employed.

The polymerized latex may be stabilized in any suitable manner, but the addition of a dispersion of an aromatic amine such as phenyl-alpha-naphthylamine is preferred. The latex may be coagulated by acids, alcohol and brine, or by heavy metal salts such as aluminum sulfate, or by freezing as described in U. S. Patent 2,187,146. The use of brine and an acid such as acetic or sulfuric acid is preferred for coagulation of sodium oleate or sodium oleate-rosinate latices. Processing of the coagulum can then be carried out by conventional means.

The polymerization products prepared as described above may be compounded in many different ways in order to obtain the best properties for various uses. The general and well-known techniques of compounding rubber and butadiene copolymer rubbers may be applied to these products. The compounded masses may then be molded, sheeted, calendered, or, in general, formed to the desired shape and vulcanized. The vulcanization may be carried out at room temperature or above, but preferably between 130° C. and 170° C.

These products are especially valuable in applications where materials which retain their rubber-like characteristics at low temperatures and in contact with oils or other chemicals are required. Such requirements are particularly encountered in certain airplane and automobile parts such as carburetor or fuel pump diaphragms and gaskets, motor mounts, gasoline hose, and the like.

I claim:

1. A synthetic, rubber-like material which has high oil- and freeze-resistance and good processing characteristics, obtained by copolymerizing a mixture comprising from 70% to 80% of butadiene 1,3, 10% to 25% of acrylonitrile, and 5% to 10% of an aliphatic vinylethinyl carbinol.

2. A synthetic, rubber-like material which has high oil- and freeze-resistance and good processing characteristics, obtained by copolymerizing a mixture comprising from 70% to 80% of butadiene 1,3, 10% to 25% of acrylonitrile, and 5% to 10% of dimethyl(vinylethinyl) carbinol.

3. A synthetic, rubber-like material which has high oil- and freeze-resistance and good processing characteristics, obtained by copolymerizing a mixture comprising 75% butadiene-1,3, 15% to 20% of acrylonitrile, and 5% to 10% of dimethyl-(vinylethinyl) carbinol.

4. A synthetic, rubber-like material which has high oil- and freeze-resistance and good processing characteristics, obtained by copolymerizing a mixture comprising 75% of butadiene-1,3, 18% of acrylonitrile and 7% of dimethyl(vinylethinyl) carbinol.

CHARLES J. MIGHTON.

REFERENCES CITED

The following references are of record in the file of this patent:

UNITED STATES PATENTS

| Number | Name | Date |
| --- | --- | --- |
| 2,234,204 | Starkweather et al. | Mar. 11, 1941 |
| 2,313,233 | Fryling | Mar. 9, 1943 |
| 1,973,000 | Konrad et al. | Sept. 11, 1934 |
| 2,335,124 | Konrad | Nov. 23, 1943 |
| 2,366,327 | Fryling | Jan. 2, 1945 |

FOREIGN PATENTS

| Number | Country | Date |
| --- | --- | --- |
| 497,841 | Great Britain | Dec. 28, 1938 |